J. MORROW.
LUBRICATOR.
APPLICATION FILED APR. 9, 1913.
1,110,706.
Patented Sept. 15, 1914.
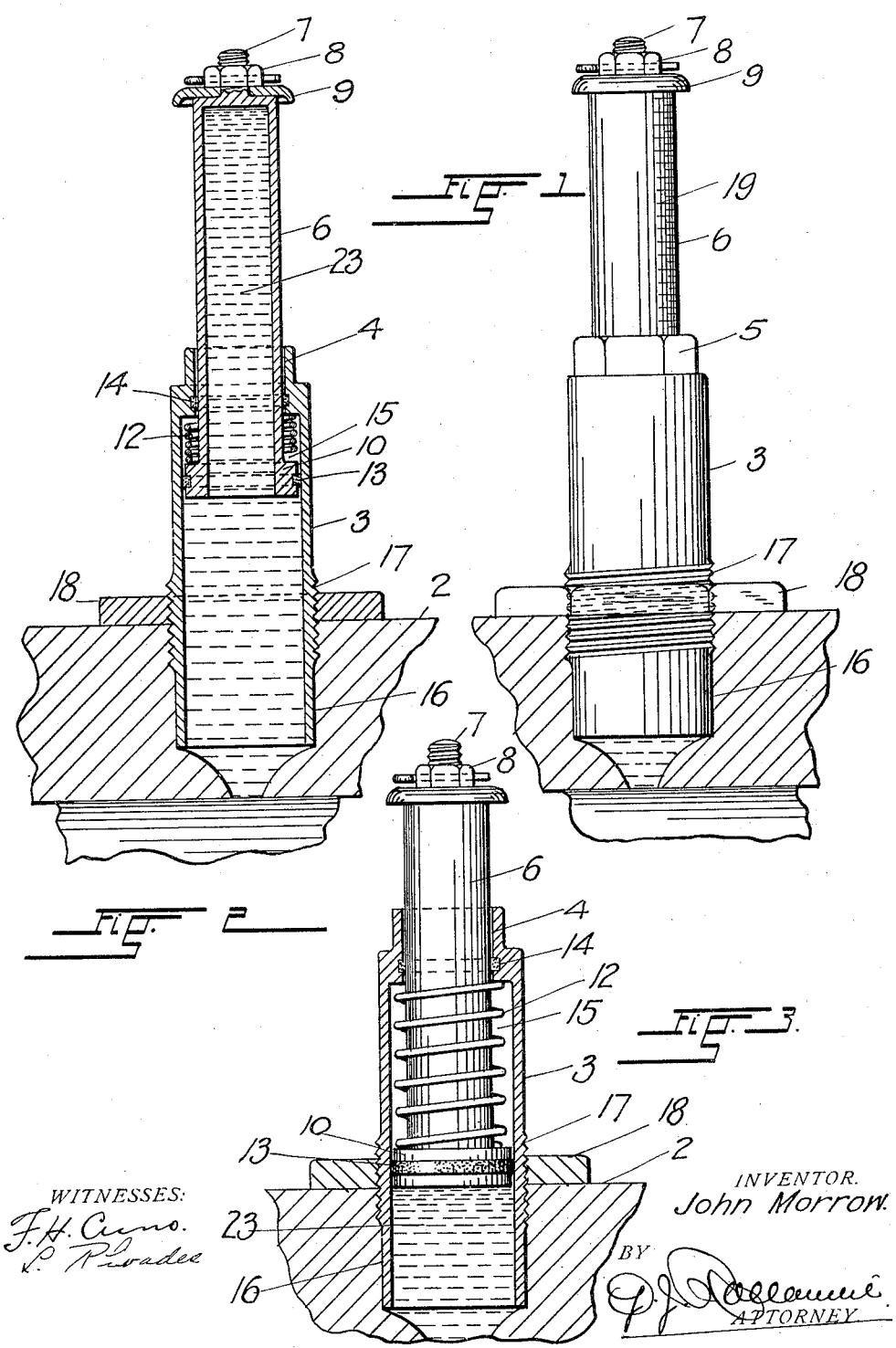
WITNESSES:
INVENTOR.
John Morrow.
BY
ATTORNEY

UNITED STATES PATENT OFFICE.

JOHN MORROW, OF DENVER, COLORADO.

LUBRICATOR.

1,110,706.   Specification of Letters Patent.   Patented Sept. 15, 1914.

Application filed April 9, 1913. Serial No. 759,871.

*To all whom it may concern:*

Be it known that I, JOHN MORROW, a citizen of the United States, residing at Denver, in the county of Denver and State of Colorado, have invented certain new and useful Improvements in Lubricators, of which the following is a specification.

This invention relates to improvements in lubricators and its principal object resides in the provision of a device of simple construction which is adapted to be used in connection with any movable or fixed part of locomotive or stationary engines, which will properly feed lubricant with which it is supplied, to the bearing, irrespective of the velocity of the part with which it is connected and which is capable of adjustment to feed any grade of hard or liquid lubricant.

Other objects of my invention consist in the provision of a lubricator which automatically provides a cushion to counteract the influence of the centrifugal force upon its movable member during its movement with the engine part with which it is associated, which exteriorly indicates the quantity of lubricant it contains, which in relation to its proportions has a maximum capacity, which is dust proof, readily applied, and easily filled, and which is provided with suitable means to maintain the members of which it is composed, in the proper position with relation to each other and the engine part with which it is connected.

In proceeding in accordance with my invention, I provide in connection with a relatively stationary, tubular housing, a hollow plunger which projects through an axial opening formed in an end thereof and which is enlarged at its inner extremity to form a piston which snugly fits within the housing. The piston-end of the plunger is open so that the interiors of the plunger and the housing form one continuous chamber which in practice is filled with the lubricant, a spring is applied between the piston at the end of the plunger and a shoulder formed at the outer end of the housing around the opening through which the plunger projects, for the purpose of causing the latter to feed the lubricant onto the bearing through the open inner extremity of the housing, and a head is removably attached at the outer end of the plunger to determine the extent of its inward movement by the action of the spring. The housing is secured in an opening of the engine part to which it is applied, by means of a screw thread formed on its exterior surface, and a set-nut is provided to prevent accidental displacement of the device, by engagement with the said part.

An embodiment of my invention has been illustrated in the accompanying drawings in the various views of which like parts are similarly designated, and in which, Figure 1 represents an elevation of my improved lubricator in connection with an engine-part to which it is applied, its plunger having been shown in the extreme position it occupies when the device is filled with the lubricant, Fig. 2, a longitudinal, axial section through the device as shown in Fig. 1, and Fig. 3, an elevation of the lubricator partially in section showing the plunger in the position it occupies after a part of the contents of the device have been discharged onto the bearing.

Referring more specifically to the drawings, the reference numeral 2 designates the engine part to which the lubricator is applied, 3 the tubular open-ended housing which at its outer extremity has a throat 4 of reduced diameter in which the plunger hereinafter to be described, is slidably fitted. The exterior surface of the outer portion of the housing around the throat 4 is preferably made of hexagon form as shown at 5 in Fig. 1, for the application of a wrench when the lubricator is being secured to or detached from the engine part.

The numeral 6 designates the hollow plunger which at its upper closed end has an axially projecting stud 7 for the application of a nut 8 which serves to fix a head 9 of larger diameter than the plunger, at the end thereof, the said head being provided to limit the inward movement of the plunger by engagement with the outer end of the housing. The plunger which as mentioned hereinabove is slidably fitted in the throat 4, is formed at its lower open extremity with an annular enlargement to provide a piston 10 which snugly fits within the housing and a spring 12 which is coiled around the plunger between the said piston and the shoulder formed at the upper end of the housing around the bore of its throat, serves to press the plunger against the fluid lubricant with which in practice both the housing and the plunger are filled, as is indicated at 23 in the drawings by broken lineshading. To prevent oil from flowing past the piston into the space 15 occupied by the spring and to at the same time, confine the air within said space for the purpose of forming a pneumatic cushion when the plunger is moved outwardly, the piston is provided with a packing ring 13 and a similar ring 14 may, if so desired, be placed in a recess of the throat to engage the exterior surface of the plunger. The air cushion formed in the space 15 will effectively counteract the tendency of the plunger to move outwardly by centrifugal force when the part to which the lubricator is applied, rotates at a high rate of speed. The housing is secured in an opening 16 of the engine part 2 by means of a thread 17 formed on its exterior surface and a set nut 18 is screwed onto the same thread to lock the housing in place by engagement with the exterior surface of the part as shown in the drawings.

When the device is placed in its operative position both the housing and the hollow plunger are filled with the lubricant as is shown in Fig. 2, the piston head of the plunger is in consequence disposed in the upper portion of the housing, and the spring 12 is compressed to cause the plunger to continuously press the oil toward the bearing on which the part 2 is mounted through the opening 16 of the latter. The length of the portion of the plunger extending beyond the outer end of the housing indicates the amount of oil or grease contained in the lubricator and to more definitely determine this amount the plunger may be provided upon its exterior surface with a graduated scale, as is shown at 19, in Fig. 1. After the lubricant contained in the device has been consumed to the extent that the plunger is moved completely into the housing and the head 9 is in engagement with the outer end of the same, the plunger still contains sufficient oil or grease to prevent the bearing from becoming dry for a period sufficiently long to obviate the necessity of stopping the engine to replenish the lubricator before the regular time set for that purpose.

Having thus described my invention what I claim and desire to secure by Letters-Patent is:

1. In a lubricator, an oil-receptacle composed of two telescoping members the inner one of which is closed at its outer end and open at its opposite end, and the outer one of which is open at its outer end which is adapted for insertion into an opening of a bearing to which the lubricator is applied, the said inner member having a plunger-portion within the outer member, and a relatively large, hollow stem the interior of which is adapted to constitute a substantial portion of the lubricant containing receptacle, and the outer member having a neck of reduced diameter through which the said stem extends, a spring disposed between the said plunger-portion and the shoulder formed around the said neck, for moving the inner member inwardly against the resistance of a body of fluid with which the receptacle is filled, and packings applied around the said plunger portion and within the said neck whereby an air cushion between the two members is produced.

2. In a lubricator, an oil-receptacle composed of two telescoping members the inner one of which is closed at its outer end and open at its opposite end, and the outer one of which is open at its outer end which is adapted for insertion into an opening of a bearing to which the lubricator is applied, the said inner member having a plunger-portion slidingly fitted within the outer member, and a relatively large, hollow stem the interior of which is adapted to constitute a substantial portion of the lubricant-containing receptacle, and the outer member having a neck of reduced diameter in which said stem is slidingly fitted, and a spring disposed between the said plunger portion and the shoulder formed around the said neck, for moving the inner member inwardly against the resistance of a body of fluid with which the receptacle is filled.

In testimony whereof I have affixed my signature in presence of two witnesses.

JOHN MORROW.

Witnesses:
G. J. ROLLANDET,
L. RHOADES.